Dec. 19, 1944.  A. NELSON  2,365,488
SHIP REPAIR PATCH
Filed March 2, 1944  2 Sheets-Sheet 1

INVENTOR.
ADOLPH NELSON
BY
ATTORNEY.

Dec. 19, 1944.  A. NELSON  2,365,488
SHIP REPAIR PATCH
Filed March 2, 1944  2 Sheets-Sheet 2

INVENTOR.
ADOLPH NELSON
BY
ATTORNEY.

Patented Dec. 19, 1944

2,365,488

UNITED STATES PATENT OFFICE 2,365,488

SHIP REPAIR PATCH

Adolph Nelson, near Las Animas, Colo.

Application March 2, 1944, Serial No. 524,719

7 Claims. (Cl. 114—227)

This invention relates to means and devices for the emergency repair of holed, ruptured, or apertured walls, shells and structures opposed to and normally in restraining relation with bodies of water, such as the hulls and exterior walls of boats, ships, and like vessels, and has as an object to provide an improved device susceptible of rapid, convenient, and positive application to a ruptured such structure in closing and obstructing relation with the adventitious opening therethrough.

A further object of the invention is to provide an improved unitary device adapted for manipulation and actuation from a remote point into clamped engagement with and obstructing relation across an accidental opening through a water-opposing structure.

A further object of the invention is to provide an improved construction of means operable to clamp and positively hold an emergency repair patch in obstructing relation across an undesired opening through a water-opposing structure.

A further object of the invention is to provide improved means for actuating and holding clamp elements of an emergency repair device.

A further object of the invention is to provide improved power means operable to clamp and hold an emergency repair device in obstructing relation with an opening to be closed.

A further object of the invention is to provide improved power means selectively and controllably operable to position and seat an emergency repair device in obstructing relation with an opening to be closed.

A further object of the invention is to provide an emergency ship repair patch unit that is compact, self-contained, portable, adapted for practical embodiment in various sizes and specific constructions, simple and inexpensive of manufacture, positive and efficient in use, susceptible of complete salvage for reuse, and adapted for the conservation of property and human lives through the application thereof to a wide variety of particular emergency needs.

My invention consists in the construction, arrangement, and combination of elements hereinafter set forth, pointed out in my claims, and illustrated by the accompanying drawings, in which—

Figure 1:
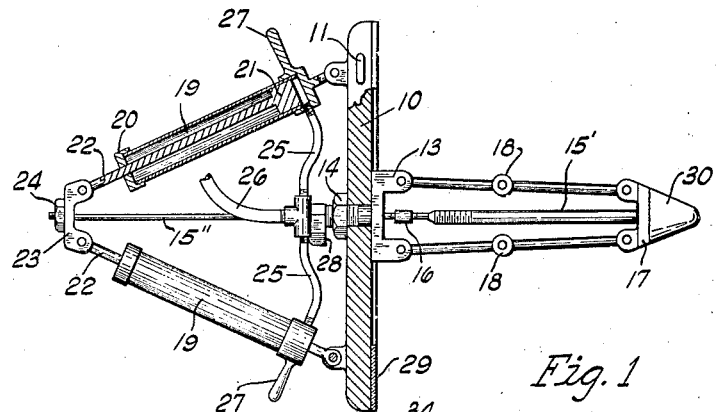
Figure 2:
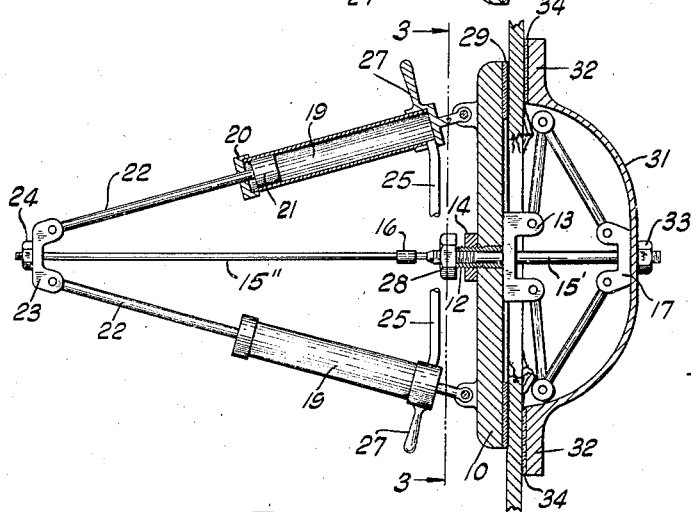
Figure 3:
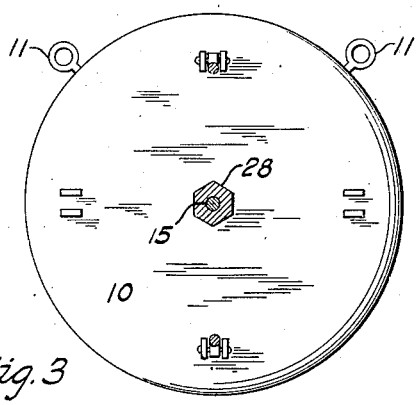
Figure 4:
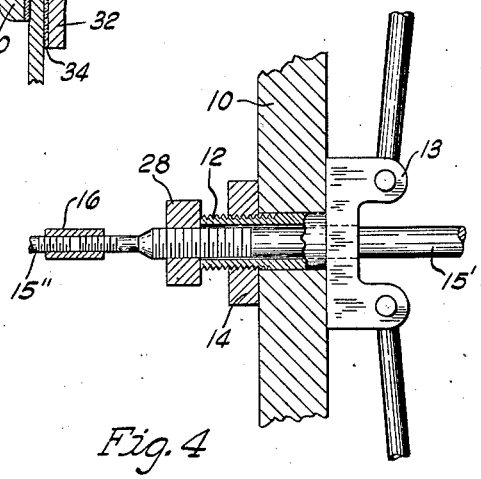
Figure 5:
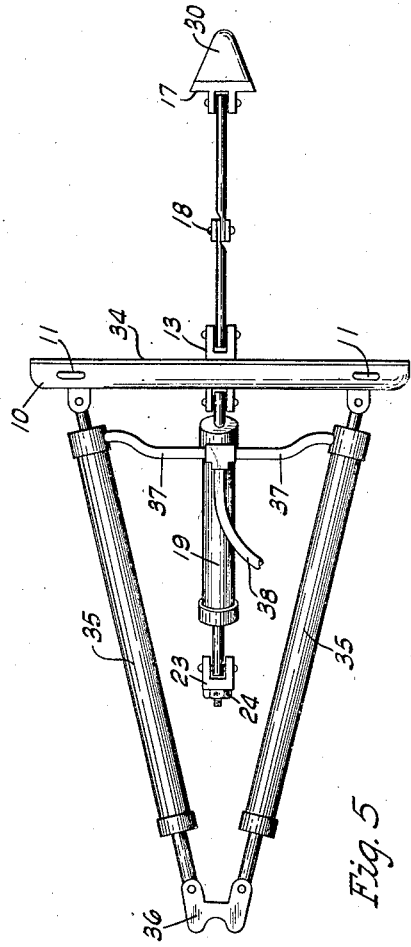
Figure 6:
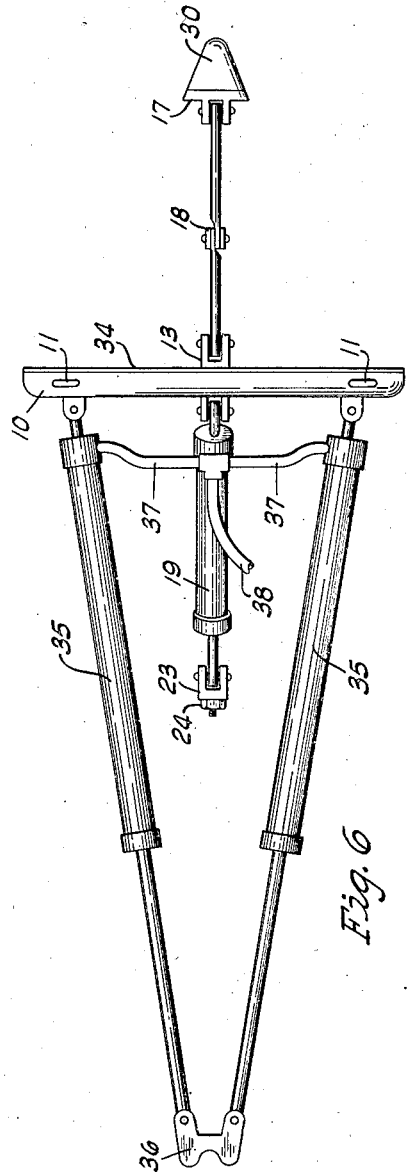

Figure 1 is a side elevation, partly in section, of a simple and somewhat conventionalized embodiment of the invention as assembled and arranged ready for practical use. Figure 2 is a section axially through the device of Figure 1 as positioned in functioning relation with a ruptured wall or structure. Figure 3 is a transverse section taken on the indicated line 3—3 of Figure 2. Figure 4 is a fragmentary, detail section, on an enlarged scale, of and through cooperating structural elements of the device. Figure 5 is an elevation of the device shown in Figure 1 as equipped with positioning and seating means ready for use. Figure 6 is a view similar to Figure 5 illustrating an alternative or operative position of the positioning and seating means.

In the construction of the improvement as shown, the numeral 10 designates a rigid, preferably circular plate adapted to overlie, cover, obstruct, and extend marginally beyond the hole to be patched. The plate 10 may be formed from any suitable material having the requisite strength and rigidity characteristics, and may be formed as either an integral or assembled unit, and said plate is preferably provided with a plurality of eyes 11 spaced about and projecting radially from its edge or margin to facilitate attachment thereto of hoisting and handling adjuncts, such as chains, ropes, slings, and the like. The plate 10 is formed with a central aperture wherethrough is received the cylindrical stem 12 of a fitting terminating at one end in a radially-enlarged head 13 adapted to engage with and bear against one side of the plate 10, and the portion of the stem 12 extending beyond the opposite side of the plate is threaded for engagement with a nut 14 whereby said fitting is firmly clamped to and in intersecting relation through said plate. The fitting is formed with a straight, axial bore which slidably accommodates a pull rod 15 thereby disposed for reciprocation axially of and through the plate 10. The pull rod 15 may be formed as a single straight element of the desired length, but for reasons which will hereinafter appear said rod preferably takes the form of a separable assembly of a larger-diameter section 15' with an axially-aligned section 15'' of lesser diameter removably connected, as by means of an oppositely-threaded coupling 16, with a stud of corresponding diameter extending axially from the adjacent end of the section 15': The rod 15, whatever be its specific construction, extends at each end beyond the plate 10 and operatively engages on the same side of the said plate as the head 13 with a collar 17 adapted to be fixed axially of and to move with said rod. The collar 17 and fitting head 13 are each provided, on their opposed faces, with diametrically aligned, coplanar hinge elements wherebetween hinged links 18 operatively connect to limit separation of the collar 17 outwardly and away from the plate 10, each of said links 18 consisting of a shorter member hinged at one end to the head 13 for actuation through an arc radially of the plate 10 and a longer member hinged at one end to and for actuation through an arc radially of the collar 17, and a hinge connection uniting the otherwise free, adjacent ends of said members, so that, when the rod 15 is moved to approach the collar 17 toward the plate 10, the shorter members of the links 18 are urged radially outwardly and ultimately into substantially parallel, offset relation with the adjacent face of said plate to dispose the knuckles forming their hinge connections with the longer members inwardly adjacent the plate outer margin. While the drawings illustrate but two of the links 18 in operative association with the other elements of the invention, it is to be understood that such showing is but typical and in no sense limitative, since any desired number of links 18 may be connected between and operatively associated with the head 13 and collar 17 when the corresponding number of hinge elements is provided on said head and collar.

The links 18 are normally extended in substantial alignment of their relatively hinged members to position the collar 17 at the limit of its separation relative to the plate 10, in which position of its elements the assembly of collar 17 and links 18 may conveniently be inserted through the hole to be obstructed and the plate 10 drawn toward and clamped in obstructing relation across the hole by moving the rod 15 to draw the collar 17 toward said plate and thereby radially extend the link shorter members into engagement of their knuckle ends with the surface of the ruptured structure opposite to that engaged by the plate margins, the force applied to move the rod 15 acting through the longer link members to force the link knuckles outwardly and draw the plate 10 firmly against and into obstructing relation across the hole in the structure. Means selectively and controllably operable to move the rod 15 axially of the plate 10 in the direction and to the extent necessary for actuation of the links 18 and consequent clamping of said plate to and in obstructing relation with the hole through the ruptured structure is shown as comprising a plurality of pressure cylinder and piston assemblies operatively engaging between the end of the rod 15 remote from the links 18 and the adjacent side of the plate 10. The cylinder and piston assemblies may be of any suitable specific construction, number, and operative association with the rod 15 and plate 10, and are illustrated in the embodiment of the invention shown as consisting of a pair of identical assemblies, each of which includes a conventional, straight, pressure cylinder 19 closed at one end and hingedly and detachably secured at its closed end to attaching means provided for such purpose on the face of the plate 10 against which the nut 14 bears, a cap 20 closing the other end of the cylinder, a piston 21 slidably engaging within and for reciprocation axially of the cylinder, and a piston rod 22 fixed centrally of and to the piston 21 and extending axially of the cylinder 19 through the cap 20 to hinge connection of its free end with suitable attaching means on and marginally of a collar 23 freely slidable on the portion of the pull rod 15 remote from the links 18 and adapted to abut against a nut 24 threadedly engaging with the end of said pull rod outwardly beyond said collar 23. The two cylinder and piston assemblies employed in the illustrated embodiment of the invention are disposed on opposite sides of the pull rod 15 and connected to diametrically opposite points on the plate 10, so that the axes of said assemblies lie in a plane containing the axis of the said pull rod diametrically of and perpendicular to the said plate 10, and the points of connection of said cylinders with said plate are spaced like distances from the plate center and to such an extent as will similarly incline said assemblies in converging relation toward their connections with the collar 23. Each cylinder 19 is served at its closed end adjacent the plate 10 by a fluid pressure line 25 wherethrough fluid under pressure, such as steam, compressed air, or the like, may be delivered interiorly of the associated cylinder to the space between the cylinder closed end and the adjacent face of the piston 21, and the separate lines 25 preferably are in simultaneous communication with a fluid pressure supply line 26, leading, through suitable valve controls, pressure reliefs, and the like, from a source or supply of fluid pressure, not shown, so that fluid under pressure delivered through the line 26 is supplied to both cylinders 19 and simultaneously and correspondingly reacts therein to move the pistons 21 outwardly along their cylinders for travel of the collar 23 away from the plate 10 and consequent corresponding travel of the pull rod 15. For convenience in handling and manipulating the device and elements thereof, suitable handles 27 are preferably provided on and in outwardly extending relation with closed ends of the cylinders 19.

The sections 15' and 15'' of the pull rod 15 are so proportioned in length as to bring the inner end of the larger section 15' through and into projecting relation beyond the threaded end of the sleeve 12 when the links 18 have been actuated and radially extended to clamp the plate 10 against the ruptured structure, as shown in Figure 2, and said inner end of the larger rod section 15' is externally threaded for engagement by a nut 28, sized to slide freely on the rod section 15'' and over the coupling 16, which may be tightened against the end of the sleeve 12, as shown in Figure 4, to hold the rod section 15' against reverse travel and the links 18 in their clamped relation with the ruptured structure. After the repair elements of the device have been locked in their clamped relation with the structure by means of the nut 28, the cylinder and piston assemblies may be disconnected and detached from the plate 10, the coupling 16 actuated to separate the sections 15' and 15'' of the pull rod, and the link-actuating elements of the device removed to leave the plate 10 and its holding and clamping means in covering relation with the hole to be repaired.

The face of the plate 10 engageable against the structure to be repaired preferably carries a relatively heavy gasket 29, of suitable yieldable material, such as soft metal, metal composition, rubberized fabric, or the like, adapted to accommodate and yieldably seal over and about surface irregularities, jagged edges, and the like, and thereby enhance the efficiency of the repair.

The outer end of the pull rod section 15' preferably projects as a threaded stud beyond the collar 17, which stud normally threadedly engages with and is smoothly covered and protected by a tapered nose 30 during storage, handling and positioning of the device. After the device has been clamped across and in obstructing relation with the hole to be repaired, in the manner illustrated by Figure 2, the nose 30 may be removed from the end of the rod section 15' to uncover the threaded stud whereon may then be mounted and secured a supplementary closure cap 31 engaging the ruptured structure in opposition to the plate 10. The cap 31 is formed with a crowned central portion adapted to bridge over and enclose the collar 17 and radially-extended links 18, a central aperture wherethrough the threaded stud may engage, and an annular, radial, flat flange 32 positioned to bear against the structure wall in opposition to margins of the plate 10 when said cap is urged toward said plate by means of a nut 33 engaged with the threaded stud and bearing against the cap crown. The sealing face of the cap flange 32 is conveniently and preferably equipped with a gasket 34 similar in construction and purpose to the gasket 29 of the plate 10.

As will be apparent, the repair device is designed to be applied to the hole to be obstructed from either side of the ruptured wall, whichever may be the more convenient of access under existing conditions. When the device is inserted from the outside, in the direction of flow through the hole, the current through the hole aids and assists in the proper location of the device and tends to urge the plate 10 toward the structure wall. On the contrary, insertion of the device through the hole against the inflow of water is a much more difficult matter and will require, particularly if the hole is large and the repair device heavy, application of power in some form to position and hold the device for application of the clamping action of the links 18, to which end the additions shown in Figures 5 and 6 may be advantageously utilized. The device shown in said latter figures is, so far as its repair functions are concerned, identical with that hereinabove described, and differs from the showing of Figures 1 to 4, inclusive, only in that an auxiliary pair of cylinder and piston assemblies 35 is detachably and hingedly secured at the closed cylinder ends to the plate 10 in the same manner as and to lie in a plane perpendicular to that of the cylinder and piston assemblies 19—21, which assemblies 35 outwardly converge to hinged connection of their piston rod outer ends with a shoe yoke 36. The cylinder and piston assemblies 35 are of such lengths when retracted as to position the shoe yoke 36 beyond the outermost limit of the range of travel attained by the collar 23, so that the assemblies 19—21 may at all times function freely and without limitation deriving from the assemblies 35 or shoe yoke 36, and said assemblies 35 are served by fluid pressure flow lines 37 branching from a supply line 38 in such manner as to permit controlled supply of fluid under pressure simultaneously to the cylinders behind their pistons for extension of the piston rods outwardly from said cylinders and consequent travel of the shoe yoke 36 away from the plate 10. The shoe yoke 36 is adapted to engage against a wall, bulkhead, stanchion, brace, or other structural fixed element suitably disposed to function as an abutment against which the extension of the assemblies 35 may act to move the plate 10 into covering relation with the hole to be repaired, or, in the absence of a suitably-placed abutment, said shoe yoke may engage with the bight of a chain, cable, rope, or sling rigged to provide the necessary purchase for reaction to the assembly extension. Obviously, the assemblies 35 and shoe yoke 36 are susceptible of convenient removal and replacement relative to the plate 10, and hence may be available for use when required without encumbering the repair device itself when their use is not necessary.

Since many changes, variations, and modifications in the specific form, construction, and arrangement of the elements shown and described may be had without departing from the spirit of the invention, I wish to be understood as being limited solely by the scope of the appended claims, rather than by any details of the illustrative showing and foregoing description.

I claim as my invention:

1. A ship repair patch comprising a rigid patch plate, an actuating rod reciprocably and perpendicularly intersecting said plate, hinged links operatively connecting, in fixed spacing of their inner ends relative to said plate, between one side of said plate and the corresponding end of said rod for extension of their members radially outwardly of and toward said plate in response to axial shifting of said rod in one direction, pressure-extensible cylinder and piston assemblies operatively between the other side of said plate and the corresponding rod end, and means for supplying fluid under pressure to said assemblies for link-actuating shifting of said rod.

2. A ship repair patch comprising, a rigid patch plate, an actuating rod centrally, reciprocably, and perpendicularly intersecting said plate, a gasket marginally of one face of said plate, hinged links operatively connecting, in fixed spacing of their inner ends relative to said plate, between the gasket face of said plate and the corresponding end of said rod for extension of their members radially outwardly of and in clamping relation toward said plate in response to axial shifting of said rod in one direction, pressure-extensible cylinder and piston assemblies operatively between the other side of said plate and the corresponding rod end, and means for selectively extending said assemblies for link-actuating shifting of said rod.

3. A ship repair patch comprising, a rigid patch plate, an actuating rod centrally, reciprocably, and perpendicularly intersecting said plate, hinged links operatively connecting, in fixed spacing of their inner ends relative to said plate, between one side of said plate and the corresponding rod end for extension of their members radially outwardly of and in clamping relation toward said plate in response to axial shifting of said rod in one direction, pressure-responsive means operatively between the other face of said plate and the corresponding rod end selectively operable to shift said rod for actuation of said links, and means for locking said rod in and against reverse travel from its shifted position.

4. A ship repair patch comprising, a rigid patch plate, an actuating rod centrally, reciprocably, and perpendicularly intersecting said plate, hinged links operatively between one side of said plate and the corresponding rod end for extension of their members radially outwardly of and in clamping relation toward said plate in response to axial shifting of said rod in one direction, pressure-responsive means operatively between the other face of said plate and the corresponding rod end selectively operable to shift said rod for actuation of said links, means for locking said rod in and against reverse travel from its shifted position, a threaded stud projecting from the link end of said rod, and a crowned cap mountable on said stud in covering relation with the extended links and in marginal opposition with said plate.

5. A ship repair patch comprising, a rigid patch plate, an actuating rod centrally, reciprocably, and perpendicularly intersecting said plate, hinged links operatively between one side of said plate and the corresponding rod end for extension of their members radially outwardly of and in clamping relation toward said plate in response to axial shifting of said rod in one direction, two sets of pressure-responsive assemblies mounted independently on and to extend away from the other side of said plate, means for selectively actuating and controlling said sets, an operative connection between the extensible elements of one of said sets and the adjacent rod end, whereby pressure reaction of said set is transmitted to effect link-actuating shifting of said rod, and an operative connection between the extensible elements of the other set adapted for abutment engagement and reaction to shift the entire device axially in response to pressure reaction of said set.

6. In apparatus of the character described having a rigid patch plate, plate-clamping members associated with and actuatable axially of said plate, and a rod centrally through and shiftable axially to actuate said members, means for selectively and controllably shifting said rod, said means comprising a set of pressure-responsive cylinder and piston assemblies detachably hinged to the plate face opposite said members, a collar slidable on said rod, hinge connections between the extensible elements of said assemblies and said collar, and a nut on the corresponding rod end to limit travel of said collar outwardly along said rod.

7. In apparatus of the character described having a rigid patch plate, plate-clamping members associated with and actuatable axially of said plate, and pressure-responsive means for actuating said members, means for positioning and seating the device against the inflow of water through the hole to be covered, said means comprising a set of pressure-responsive cylinder and piston assemblies detachably secured to and extending away from the face of said plate remote from said members, an abutment-engageable shoe operatively interconnecting the free ends of the assembly extensible elements, and means for the controlled supply of fluid under pressure simultaneously to all of the cylinders of said set.

ADOLPH NELSON.